United States Patent
Brown (10) Patent No.: US 7,408,556 B2
(45) Date of Patent: Aug. 5, 2008

(54) SYSTEM AND METHOD FOR USING DEVICE DEPENDENT FONTS IN A GRAPHICAL DISPLAY INTERFACE

(75) Inventor: David Colin Wilson Brown, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 23 days.

(21) Appl. No.: 11/047,855

(22) Filed: Jan. 31, 2005

(65) Prior Publication Data

US 2006/0170685 A1 Aug. 3, 2006

(51) Int. Cl.
*G06T 11/00* (2006.01)
(52) U.S. Cl. .......................... 345/471; 345/469; 345/468
(58) Field of Classification Search .................. 345/471, 345/469, 467, 468
See application file for complete search history.

(56) References Cited

U.S. PATENT DOCUMENTS

| | | | | |
|---|---|---|---|---|
| 5,526,477 A | * | 6/1996 | McConnell et al. | 345/467 |
| 5,859,648 A | * | 1/1999 | Moore et al. | 345/471 |
| 6,073,148 A | * | 6/2000 | Rowe et al. | 715/542 |
| 6,377,354 B1 | * | 4/2002 | Nguyen et al. | 358/1.11 |
| 6,421,055 B1 | * | 7/2002 | Jones et al. | 345/471 |
| 6,476,925 B2 | * | 11/2002 | Nguyen et al. | 358/1.13 |
| 6,490,051 B1 | * | 12/2002 | Nguyen et al. | 358/1.15 |
| 6,522,330 B2 | * | 2/2003 | Kobayashi | 345/467 |
| 6,657,625 B1 | * | 12/2003 | Chik et al. | 345/467 |
| 6,985,146 B2 | * | 1/2006 | Shade et al. | 345/467 |
| 2004/0160443 A1 | * | 8/2004 | Beaman et al. | 345/467 |
| 2004/0225773 A1 | * | 11/2004 | Wang et al. | 710/200 |

* cited by examiner

*Primary Examiner*—Ulka Chauhan
*Assistant Examiner*—Daniel Washburn
(74) *Attorney, Agent, or Firm*—Workman Nydegger (57) ABSTRACT

An improved system and method for using a device-dependent font in a graphical display interface is provided. A font resource may be included among components provided for executable software code such as an application to display and edit text using a device-dependent font without having to install the device driver having the device-resident font metrics. In specific, a font resource that may include device-independent font information for code points that are not supported by a device-resident font and device-dependent font information for code points that are supported by a device-resident font. In one embodiment, the font resource may be a device composite font file having both device metrics for code points supported by a named device and device-independent information for code points unsupported by the device.

19 Claims, 4 Drawing Sheets

```
302 — <FontFamily Baseline="0.922" Height="1.172">
304 —   <FamilyName
306 —     Culture="en-US"
308 —     Name="GillSans ExtraBold (Xerox Phaser 7700DX)"/>

310 —   <FamilyTypeface Weight="Bold" Stretch="Normal" Style="Normal">
312 —     <FamilyTypeface.DeviceFont
314 —       Name="GillSans ExtraBold (Xerox Phaser 7700DX)">
316 —       <DeviceMetrics Unicode="001f" Horizontal="0,0.333,0"/>
318 —       <DeviceMetrics Unicode="0020" Horizontal="0,0.333,0"/>
320 —       <DeviceMetrics Unicode="0021" Horizontal="0,0.365,0"/>
322 —       <DeviceMetrics Unicode="0022" Horizontal="0,0.5,0"/>
324 —       <DeviceMetrics Unicode="0023" Horizontal="0,0.667,0"/>
              .
              .
              .
326 —       <DeviceMetrics Unicode="2044" Horizontal="0,0.125,0"/>
328 —       <DeviceMetrics Unicode="20ac" Horizontal="0,0.677,0"/>
330 —       <DeviceMetrics Unicode="2122" Horizontal="0,1,0"/>
332 —       <DeviceMetrics Unicode="2212" Horizontal="0,0.667,0"/>
334 —       <DeviceMetrics Unicode="fb01" Horizontal="0,0.76,0"/>
336 —       <DeviceMetrics Unicode="fb02" Horizontal="0,0.76,0"/>
338 —     </FamilyTypeface.DeviceFont>
340 —   </FamilyTypeface>

342 —   <FamilyMap Target="Arial Black">
344 — </FontFamily>
```

SYSTEM AND METHOD FOR USING DEVICE DEPENDENT FONTS IN A GRAPHICAL DISPLAY INTERFACE

FIELD OF THE INVENTION

The invention relates generally to computer systems, and more particularly to an improved system and method for using a device-dependent font in a graphical display interface.

BACKGROUND OF THE INVENTION

A font is a set of displayable images known as "glyphs," each of which depicts a letter, character or symbol. Each glyph can be thought of as the computer-age equivalent of a block of type used in a printing press. Developing a font is a skilled, labor intensive task. Typographers spend many hours crafting each glyph in a font, and consider not only the shape of the glyph itself, but also how the glyph will look in any likely combination with other glyphs. Because developing a font for a single language is challenging, device manufacturers may only develop particular fonts that a specific device may support. Such device fonts are traditionally stored in the device driver for the device. Unfortunately, there are several problems with this approach for creating and deploying device fonts.

Because device-resident font metrics may be stored in device drivers, editing documents that may use a device-resident font becomes dependent on device driver installation. Existing support for device fonts in current operating systems is limited to allowing an application to enumerate and format documents for installed and connected devices. As a result, a document employing device-resident fonts cannot be freely distributed. No mechanism yet exists, for example, for identifying how to represent a given printer device font on a display screen, or for ensuring that a document remains usable when viewed or edited on a system which does not have the target device installed and connected. Applications are left to implement these features by themselves.

What is needed is a way for a computer system to use a device-dependent font in a graphical display without having to load the device driver so that a user may display and/or edit a document formatted using the device-dependent font. Such a system and method should provide predictability of the screen fonts a user will see when a user chooses a particular printer font for display of text.

SUMMARY OF THE INVENTION

Briefly, the present invention provides an improved system and method for using a device-dependent font in a graphical display interface. To this end, the present invention provides components for executable software code such as an application to display and edit text using a device-dependent font without having to install the device driver having the device-resident font metrics. Among the components provided may be a font resource that may include device-independent font information for code points that are not supported by the device-resident font and device-dependent font information for code points that are supported by the device-resident font. In one embodiment, the font resource may be a device composite font file having both device metrics for code points supported by a named device and device-independent information for code points unsupported by the device.

Executable software code may associate a font resource with text corresponding to code points and may send a request to the operating system to output the text on an output device. A glyph generator operably coupled to the executable software code may receive the text and determine whether the code points may be supported by the output device, and, if so, may send the code points to the output device. The output device may, in turn, lookup the glyphs corresponding to the code points and then output the glyphs on the output device. In an embodiment, the output device may be a printer. If the glyph generator may determine that the code points may not be supported by the output device, the glyph generator may send the code points and glyphs associated with the code points to the output device to be output. In an embodiment, the output device may be a display.

Advantageously, any type of device-resident font may be included in a font resource so that an executable may edit any text using a device-resident font without depending upon device driver installation. Moreover, the device-independent font information for code points that are not supported by the device-resident font may provide predictability of the display fonts used for displaying text formatted using a device-resident font. Other advantages will become apparent from the following detailed description when taken in conjunction with the drawings, in which

DETAILED DESCRIPTION

Exemplary Operating Environment

Figure 1:
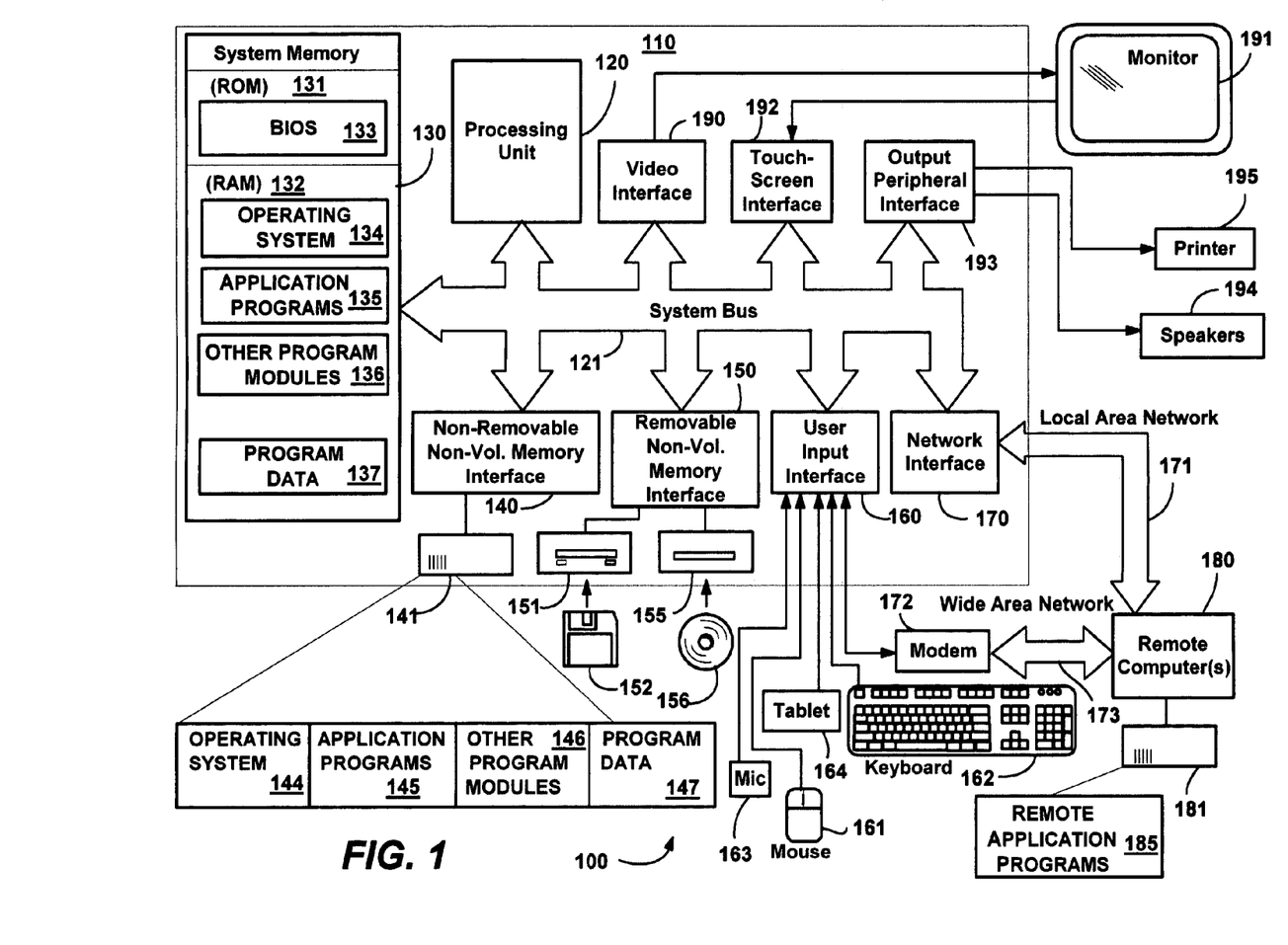
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like connected to the system bus 121 via touch screen interface 192. Note that the monitor and/or touch screen panel can be physically coupled to a housing in which the computing device 110 is incorporated, such as in a tablet-type personal computer. In addition, computers such as the computing device 110 may also include other peripheral output devices such as speakers 194 and printer 195, which may be connected through an output peripheral interface 193 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN)

171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Using Device-Dependent Fonts in a Graphical Interface

The present invention is generally directed towards a system and method for using device dependent fonts in a graphical interface. The system and method may advantageously allow executable software code such as an application to display and edit text using a device-dependent font without having to install the device driver having the device-resident font metrics. To do so, the present invention may provide a font resource that may include device-independent font information for code points that are not supported by the device-resident font and device-dependent font information for code points that are supported by the device-resident font. Any executable may associate such a font resource to display text that may have corresponding code points supported on a device. A code point, as used herein, may mean a Unicode representation of a character.

As will be seen, the architecture of the present invention provides components for determining whether an output device, such as a printer, may receive code points supported by the device-resident font or whether glyphs associated with the code points should be sent to the output device, as in the case of a display, which may use code points unsupported by the device-resident font. Thus, for example, the device-independent font information may provide support for displaying the text in international languages such as Chinese and Japanese eventhough the characters supported by the device-dependent font information may only be used by the specific device. As will be understood, the various block diagrams, flow charts and scenarios described herein are only examples, and there are many other scenarios to which the present invention will apply.

Figure 2:
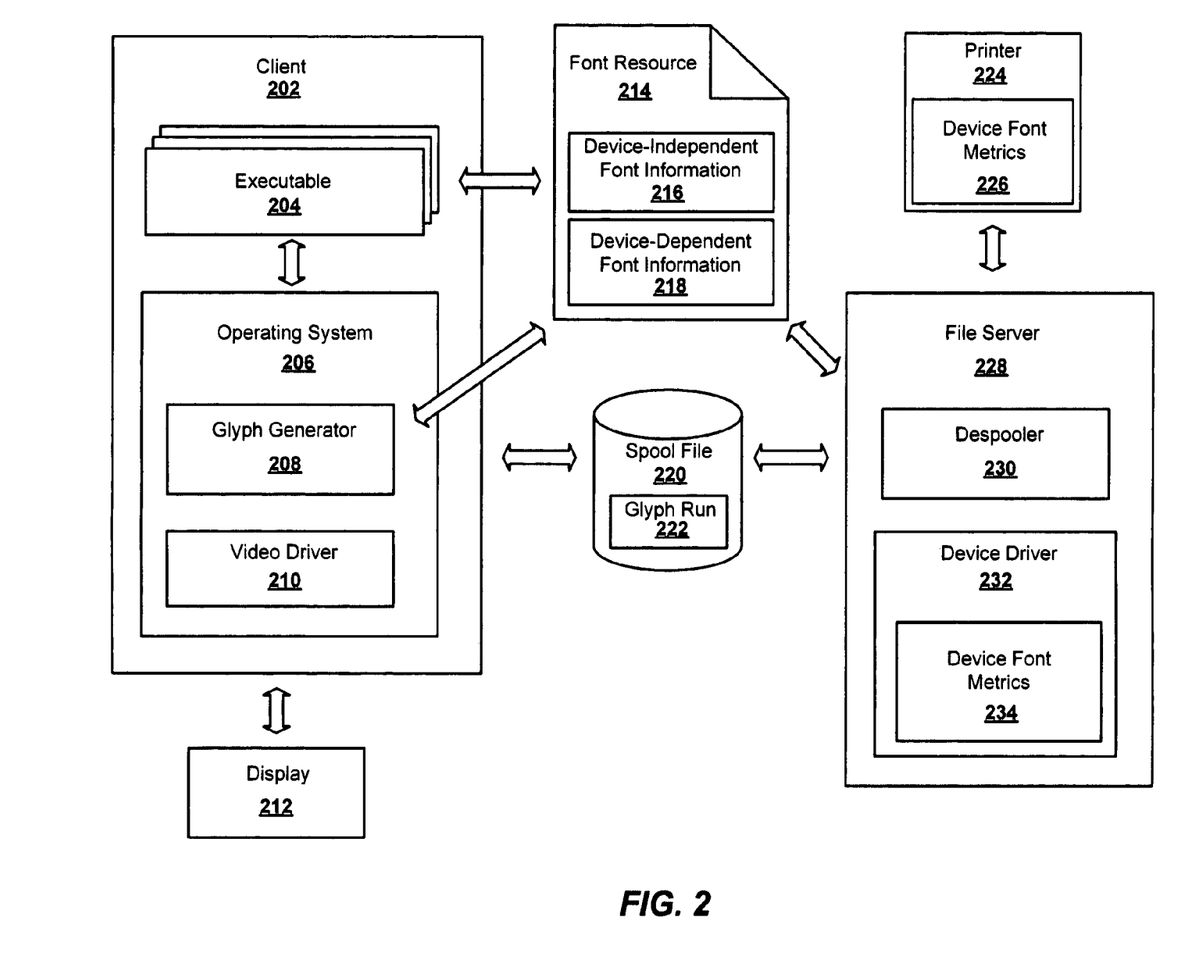
FIG. 2 is a block diagram generally representing an exemplary architecture of system components in one embodiment for using a device-dependent font in a graphical display interface, in accordance with an aspect of the present invention.

Turning to FIG. 2 of the drawings, there is shown a block diagram generally representing an exemplary architecture of system components in one embodiment for using a device-dependent font in a graphical display interface. Those skilled in the art will appreciate that the functionality implemented within the blocks illustrated in the diagram may be implemented as separate components or the functionality of several or all of the blocks may be implemented within a single component. As an example, the functionality of the video driver 210 may be implemented in a separate component.

A client computing system 202 shown in FIG. 2 may be operably coupled to a display 212 and a file server 228. The client computing system 202 may include one or more executables operably coupled to an operating system 206 and a font resource 214. The executables may be executable software code for editing characters that may each correspond to a code point such as a code designated for a character by the Unicode system. The operating system 206 may include a glyph generator 208 and a video driver 210 operably coupled to display 212. The glyph generator 208 may be any executable software code including a kernel component, an application component, a component of a linked library, an object, and so forth. The glyph generator 208 may receive code points corresponding to characters from an executable and may access a font resource such as font resource 214 to obtain glyphs associated with each code point for sending the code points and/or the glyphs associated with the code points to one or more device drivers for output on an output device.

In one embodiment, the glyph generator 208 may send glyphs associated with each code point to a video driver 210 to output on a display 212. In another embodiment, the glyph generator 208 may send code points supported by a device driver to the device driver which, in turn, may obtain the glyphs associated with the code points for output on a printer or may alternatively send the code points to the printer which may have a character map table to lookup the glyphs associated with the code points. For example, the glyph generator 208 may send a glyph run to a spool file of a file server such as file server 228 for printing. A glyph run may be a device-independent representation of a text string including code points and associated glyphs with drawing instructions. A device driver such as device driver 232 may then send the code points supported by the device to a printer such as printer 224 which may look up the glyphs associated with the code points and print them on a page.

The font resource 214 may be a file, an object, an executable, or other component that may include device-independent font information 216 and device-dependent font information 218. Device-independent font information, as used herein, means font information, including metrics, for code points that are not supported by the font information resident in a device driver for an output device. Device-dependent font information, as used herein, means font information, including metrics, for code points that are supported by the font information resident in a device driver for an output device. In one embodiment, the font resource 214 may be a device composite font file having both device metrics for code points supported by a named device and device-independent information for code points unsupported by the device. Furthermore, the device composite font file may include a character map table that may map a code point to a glyph, for example by mapping a Unicode code point to a glyph index. A device composite font file may also include a table of drawing instruction for composing a glyph. To handle ligatures in various embodiments, a device composite font file may also include a glyph substitution table that may substitute one glyph for two or more glyphs.

The file server 228 may be operably coupled to a printer 224 having device font metrics 226 and may be operably coupled to a spool file 224 having a glyph run 222. The file server 228 may include a despooler 230 that may read the spool file and convert the glyph run into the particular printer language for the printer 224. The despoiler 230 may be any executable software code including a kernel component, an application component, a component of a linked library, an object, and so forth. The file server 228 may also include a device driver 232 having device font metrics 234. The device font metrics 226 and 234 may each be a file that includes the device font name, the glyphs for code points supported by the device, and a character map table that may map a code point to a glyph.

In one embodiment, the despooler 230 may pass the characters in the glyph run 222 to the device driver 232. By inspecting the device font name, the despooler 230 may know that the device driver 232 may have the device font, and the despooler 230 may then send the code points to the device driver 232 for the printer 224 using the device font name, instead of having to obtain the glyph shapes for the individual glyphs and having to send the glyph shapes to the printer 224. The printer 224 may include device font metrics 226 for looking up the glyphs associated with the code points for printing on a page.

Those skilled in the art will appreciate that the client computing system 202 operably coupled to a file server 228 shown in FIG. 2 may be but one exemplary embodiment for practicing the present invention and that other computing system configurations may be used to implement the present invention. For example, client computing system 202 may also include a device driver having device font metrics for directly printing on printer 224. In this example, the glyph generator 208 may send code points supported by such a device driver to the device driver which, in turn, may send the code points to the printer 224. Printer 224 may then look up the glyphs associated with the code points and print them on a page.

Figure 3:
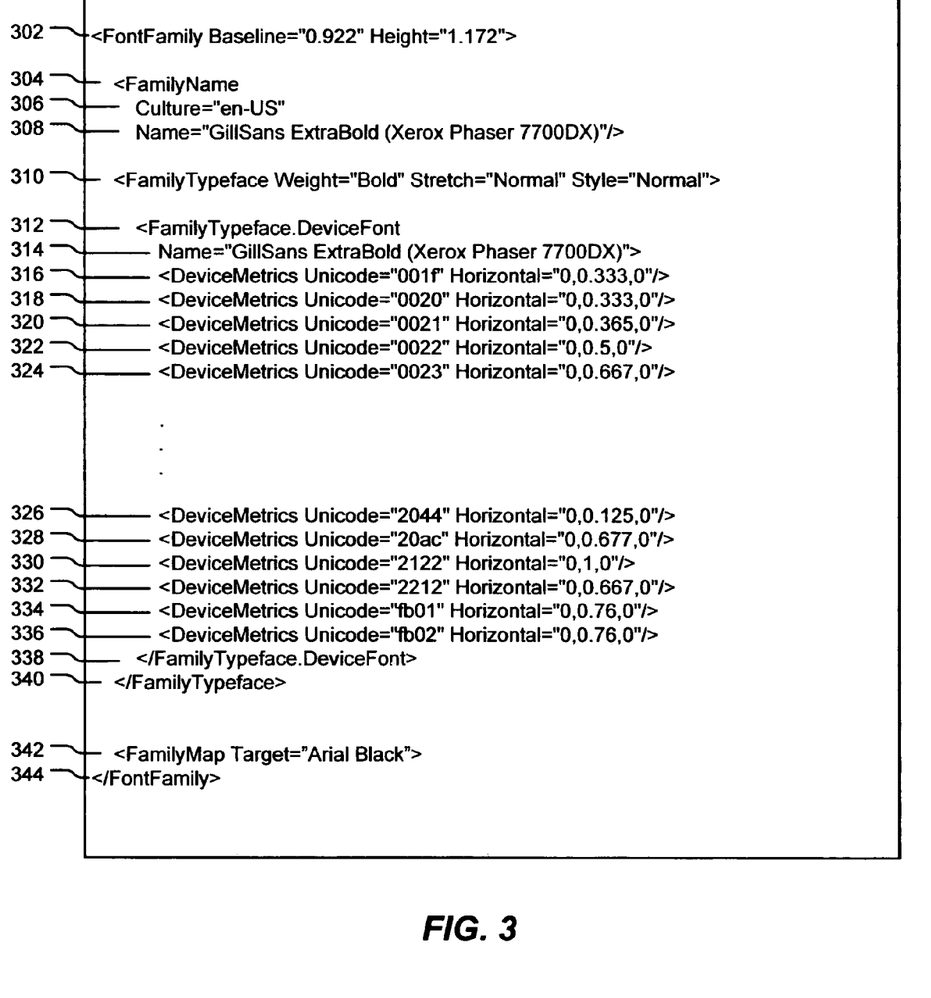
FIG. 3 is an illustration generally representing exemplary markup language for defining a device composite font file, in accordance with an aspect of the present invention.

FIG. 3 presents an illustration generally representing exemplary markup language for defining a device composite font file as one embodiment of a font resource. The exemplary markup language, XAML, may be one embodiment of the way in which a font resource may be implemented and should not be considered limiting to either the file format or the syntax shown. A device composite font may be defined by specifying a font family that may include device-independent font information and device-dependent font information as is shown in this embodiment. For example, lines 302 through 344 of FIG. 3 may define a font family. Within the declaration of the font family, there may be defined the culture of the family name. For example, the lines 304-306 define the family name as "GillSans ExtraBold (Xerox Phaser 7700DX)" and assign a culture value of "en-US".

Next, lines 310-340 may define device-dependent font information of the font family. For example, family typeface properties such as weight, stretch and style may be assigned values that may apply to the device-dependent font information of the font family. For instance, line 310 illustrates assigning a value of "Bold" to the weight property, a value of "Normal" to the stretch and style properties. Furthermore, a family type face may be declared with an explicit device font name and a list of device metrics for code points supported by the device. For example, the declaration of line 314 defines the device font name as "GillSans ExtraBold (Xerox Phaser 7700DX)" and the declaration of line 316 defines a horizontal width of (0, 0.333, 0) for Unicode 001f. There may be a declaration for each code point supported by the device font such as the declarations of lines 316-336.

Besides defining device-dependent font information of a font family, a device composite font may also define device-independent font information for the font family that may include font information for code points unsupported by the device. For example, the declaration of line 342 defines a family map for any code points unsupported by the device font so that any code point that are not defined in the device-dependent font information for the device font may be mapped to the target font type named "Arial Black." Thus, code points that may be unsupported by a device font may be used by an executable for output on other devices such as a display. In this way, a device composite font file may be both device-independent as well as available for use with documents that may be formatted using a device-dependent font.

In addition to authoring a device composite font file, a software tool may be automatically run when a device driver may be installed and the software tool may use the device font metrics from the device driver to generate a device composite font file that may be augmented with other code points desired that may not be supported by the device driver. Once created, a device composite font file may be stored along with other font files and may appear in font lists displayed by a menu of a graphical user interface. As may be appreciated by those skilled in the art, there may be one device composite font file for each font that a device may support. In other embodiments, there may be several fonts included in a device composite font file that one or more devices may support.

Figure 4:
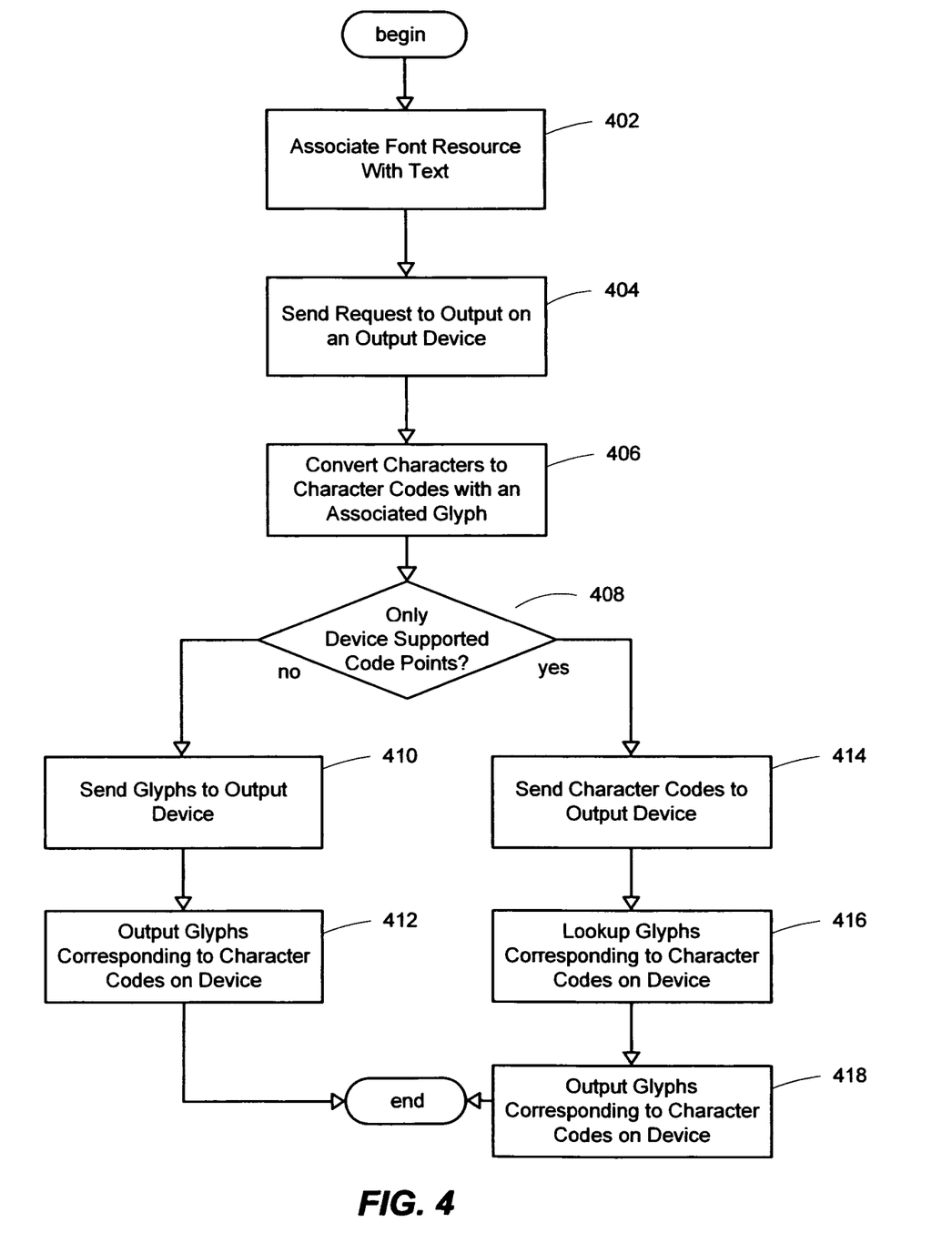
FIG. 4 is a flowchart generally representing exemplary steps undertaken in one embodiment for using a device-dependent font in a graphical display interface, in accordance with an aspect of the present invention.

FIG. 4 presents a flowchart generally representing exemplary steps undertaken in one embodiment for using a device-dependent font in a graphical display interface. Those skilled in the art will appreciate that an implementation may choose to perform these steps in a different order or may choose to perform only some of these steps for purposes of efficiency or flexibility, while achieving the same effect and without departing from the scope of the present invention. At step 402 a font resource may be associated with text. In one embodiment, a device composite font file may be associated with the text by an executable such as a text editor operably coupled to the font file. For example, the editor may have a menu item for selecting a font from a list of available fonts. The font name may include the printer name as part of the font name so that a user may then create or associate text with this device font that will look best when printed on the named printer.

At step 404, a request may be sent to output the text on an output device. An executable, for instance, may send a request to the operating system to output the text on an output device. In one embodiment, the executable may request that the text to be output on a display. In another embodiment, the executable may request that the text be output on a printer. At step 406, each character of the text may be converted to a character code and an associated glyph. In one embodiment, a glyph generator such as glyph generator 208 may access a device composite font file to convert a character stream of text into a glyph run that may include code points, measurements and drawing instructions for arrangement of glyphs on an output device.

At step 408, it may be determined whether the glyph run only includes character codes supported by the output device. For example, the device dependent font information may specify the fonts supported by the selected output device and the character codes in the glyph run generated from the text may be determined to include only code points that are specified in the device dependent font information of a device composite font file. In one embodiment, the device font name may be included in a glyph run that may only include code points that are specified in the device dependent font information of a device composite font file.

If the glyph run only includes character codes supported by the output device, then the character codes may be sent to the output device at step 414. Since the output device may support each of the code points generated from the text and the output device may have the device metrics including an association of a glyph for each supported code point, only the code points need be sent to the output device and the output device may use the code point to lookup the associated glyph. In one embodiment, a device driver may receive the code points from the glyph generator and may then send the code points to the output device. The output device may then lookup the glyph associated for each code point at step 416 and may output the glyphs corresponding to each character code at step 418. For example, the glyph generator 208 may send code points supported by such a device driver to the device driver which, in turn, may send the code points to the printer 224. Printer 224 may then look up the glyphs associated with the code points and print them on a page. After the glyphs are output, processing may be finished.

Returning to step 408, if it may be determined that the glyph run includes character codes not supported by the output device, then each glyph associated with a code point may be sent to the output device at step 410. For example, the output device may be a display and there may be several code points generated from the text that are code points supported in the device-independent information of the device composite font file. The glyph generator 208 may generate a glyph for each character for sending to a video driver 210 to render on the display 212. At step 412, the glyphs may be output. After the glyphs are output, processing may be finished.

Advantageously, the system and method may allow characters other than those supported by a specific device to be used for other output devices such as a display. Moreover, an executable may embed a font in a document which may look best on a specific output device, such as a printer, without depending upon installation of the device driver for that specific output device. Independent of installed devices, an executable may thus choose a font resource using the present invention for formatting text and the operating system may map the appropriate font for particular output devices using the font resource. Any application may now use device-resident fonts by just having the font resource available and without having to write special code to handle device-resident fonts.

As can be seen from the foregoing detailed description, the present invention provides an improved system and method for using device-dependent fonts in a graphical interface. The system and method may advantageously allow executable software code such as an application to display and edit text using a device-dependent font without having to install the device driver having the device-resident font metrics. The system and method provided is extensible. Any type of device-dependent font may be used and any executables may display the text using device-independent fonts. Thus, for example, the present invention may provide support for displaying the text in international languages such as Chinese and Japanese even though the characters supported by the device-dependent font information may only be used by the specific device. As is now understood, the system and method thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for presenting characters at a first output device that are supported by font information within a device driver of a second output device even though the first output device does not have access to a device driver for the second output device, the system comprising:
   one or more processors;
   system memory;
   executable software code for editing characters corresponding to code points;
   a composite font file operably coupled to the executable software code, the composite font file containing both device-dependent font information and device-independent font information together within the composite font file, the combination of the device-dependent font information and the device-independent font information within the composite font file defining a font family for the first device, the device-dependent font information of the font family dictating metrics for code points that are supported by font information resident in the device driver, the device-independent font information of the font family dictating metrics for code points that are not supported by the font information in the device driver;
   a glyph generator operably coupled to the executable software code-configured to:
      receive code points from the executable software code;
      refer to the composite font file that contains both device-dependent font information and device-independent font information to obtain glyphs for display at the first output device, including:
         referring to the device-dependent font information within the composite font file to obtain glyphs for code points supported by font information in the device driver;
         referring to the device-independent font information within the composite font file to obtain single glyphs that match code points not supported by font information in the device driver and without reference to the device-dependent font information; and
      send the obtained glyphs to the first output device; and
   wherein the first output device is configured to receive and present the obtained glyphs, presenting glyphs including:
      presenting glyphs for code points that are supported by font information within the device driver, even though the computer system does not have access to the device driver; and
      presenting glyphs for code points that are not supported by font information within the device driver and are thus not otherwise presentable at the second output device.

2. The system of claim 1 wherein the device-dependent font information indicates how one or more Unicode code points supported within the device driver are to be presented.

3. The system of claim 1 wherein the first output device comprises a video display.

4. The system of claim 1 wherein the first output device comprises a printer.

5. The system of claim 1 wherein the first output device comprises a video display and the second output device comprises a printer.

6. The system of claim 1 wherein the composite font file having device-dependent font information for code points supported within the device driver comprises device font metrics for code points supported by the second output device.

7. The system of claim 1 including a computer-readable storage medium, wherein the computer-readable storage medium stores computer-executable components including the executable software code, the composite font file, the glyph generator, and the configuration of the first output device to receive and present the obtained glyphs.

8. A method for presenting text at a first output device in a device-dependent font supported within a device driver for a second device, even though the device driver is inaccessible to the first output device, and in a device-independent font not supported with the device driver for the second device, the method comprising the steps of:
- receiving a request from a text editor application to output a portion of text at the first output device;
- identifying a code point for each character within the portion of text;
- for each identified code point, referring to a composite font file to identify the appropriate glyph corresponding to the code point, the composite font file containing both device-dependent font information and device-independent font information together within the composite font file, the combination of the device-dependent font information and device-independent font information within the composite font file defining a font family for the first device, the device-dependent font information of the font family dictating metrics for code points that are supported by font information resident within the device driver, the device-independent font information dictating metrics for code points that are not supported by font information resident within the device driver;
- for at least one code point, obtaining a single glyph that matches the at least one code point from the dictated metrics in the device-independent font information within the composite font file without reference to the metrics in the device-dependent font information; and
- sending sufficient information to the first output device to output the appropriate glyphs at the first output device, including the glyph obtained from the metrics in the device-independent font information within the composite font file such that the first output device accurately outputs glyphs not supported by the device driver.

9. The method of claim 8, wherein the device-dependent font information indicates how one or more Unicode code points supported within the device driver are to be presented.

10. The method of claim 8 wherein referring to a composite font file to identify the appropriate glyph corresponding to the code point comprises referring to the device-independent font information to map a code point to a glyph in a separate font that is not supported within the device driver.

11. The method of claim 8 further comprising:
- receiving a request to output the portion of text at the second output device; and
- sending sufficient information to the second output device to output the appropriate glyphs at the second output device.

12. The method of claim 11 wherein sending sufficient information to the second output device to output the appropriate glyphs at the second output device comprises sending one or more code points supported within the device driver and one or more glyphs for code points not supported within the device driver.

13. The method of claim 12 wherein the first output device comprises a display configured to display characters unsupported by the second output device.

14. A computer-readable storage medium having computer-executable instructions for performing the method of claim 8.

15. At a computer system communicatively coupled to both a video display and a printer, a method for presenting text at the video display in a printer-dependent font supported within a printer driver even though the printer driver is not installed at the computer system, and in a device-independent font not supported within the device driver for the printer driver, the method comprising:
- an act of receiving a request from a text editor application to output a portion of text at the video display;
- an act of identifying a code point for each character within the portion of text;
- for each identified code point:
  - an act of referring to a composite font file to identify the glyph corresponding to the code point, the composite font file containing both printer-dependent font information and printer-independent font information together within the composite font file, the combination of printer-dependent font information and printer-independent font information defining a font family for the video display, the printer-dependent font information of the font family dictating metrics for code points that are supported by font information resident within the printer driver, the printer-independent font information dictating metrics for code points that are not supported by font information resident within the printer driver;
- for at least one code point, an act of obtaining a single glyph matching the at least one code point from the dictated metrics in the device-independent font information within the composite font file, without reference to the metrics in the device-dependent font information;
- an act of sending sufficient information to the video display to output the corresponding glyphs at the video display, including the glyph obtained from the metrics in the device-independent font information within the composite font file such that the video display accurately outputs glyphs not supported by the printer driver; and
- an act of outputting the corresponding glyphs at the video display.

16. The method as recited in claim 15, wherein the act of referring to a composite font file to identify the appropriate glyph corresponding to the code point comprises an act of referring to the printer-dependent information to determine that the code point corresponds to a glyph that is supported within the printer driver.

17. The method as recited in claim 15, wherein the act of referring to a composite font file to identify the appropriate glyph corresponding to the code point comprises an act of referring to the printer-independent information to map to the code point to a glyph that is not supported within the printer driver.

18. The method as recited in claim 15, wherein the act of sending sufficient information to the video display to output the appropriate glyphs at the video display device comprises an act of sending a mapped glyph, identified through reference to the font-independent information, for display at the video display, even though the printer driver does not support the mapped glyph.

19. The method as recited in claim 15, wherein the act of outputting the corresponding glyphs at the video display comprises an act of outputting a glyph selected form among a Chinese glyph and a Japanese glyph even though the font information in the printer driver does not support the code point corresponding to the glyph, wherein the glyph is obtained solely through reference to the composite font file.

* * * * *